United States Patent [19]

Smith

[11] Patent Number: 4,885,950
[45] Date of Patent: Dec. 12, 1989

[54] BEVEL GEAR BACKLASH AND CLUTCH DEVICE

[75] Inventor: Roger Smith, Imlay City, Mich.

[73] Assignee: The United States of America as represented by the Secretary of the Army, Washington, D.C.

[21] Appl. No.: 326,778

[22] Filed: Mar. 20, 1989

[51] Int. Cl.⁴ .............................................. F16H 55/18
[52] U.S. Cl. ........................................ 74/409; 74/417; 74/423
[58] Field of Search .................. 74/409, 417, 423, 426

[56] References Cited

U.S. PATENT DOCUMENTS

| 829,958 | 9/1906 | Fairman | 74/423 X |
| 4,524,643 | 6/2985 | Ziegler et al. | 74/409 X |
| 4,742,725 | 5/1988 | Nagai | 74/417 X |

Primary Examiner—Philip C. Kannan
Attorney, Agent, or Firm—Peter A. Taucher; Gail S. Soderling

[57] ABSTRACT

An antibacklash beveled gear drive is disclosed. The drive is constructed to adjust for intial misalignment and subsequent wear. One of the gears is journaled on a driven shaft and has a biasing means which bump the gears into engagement.

1 Claim, 1 Drawing Sheet

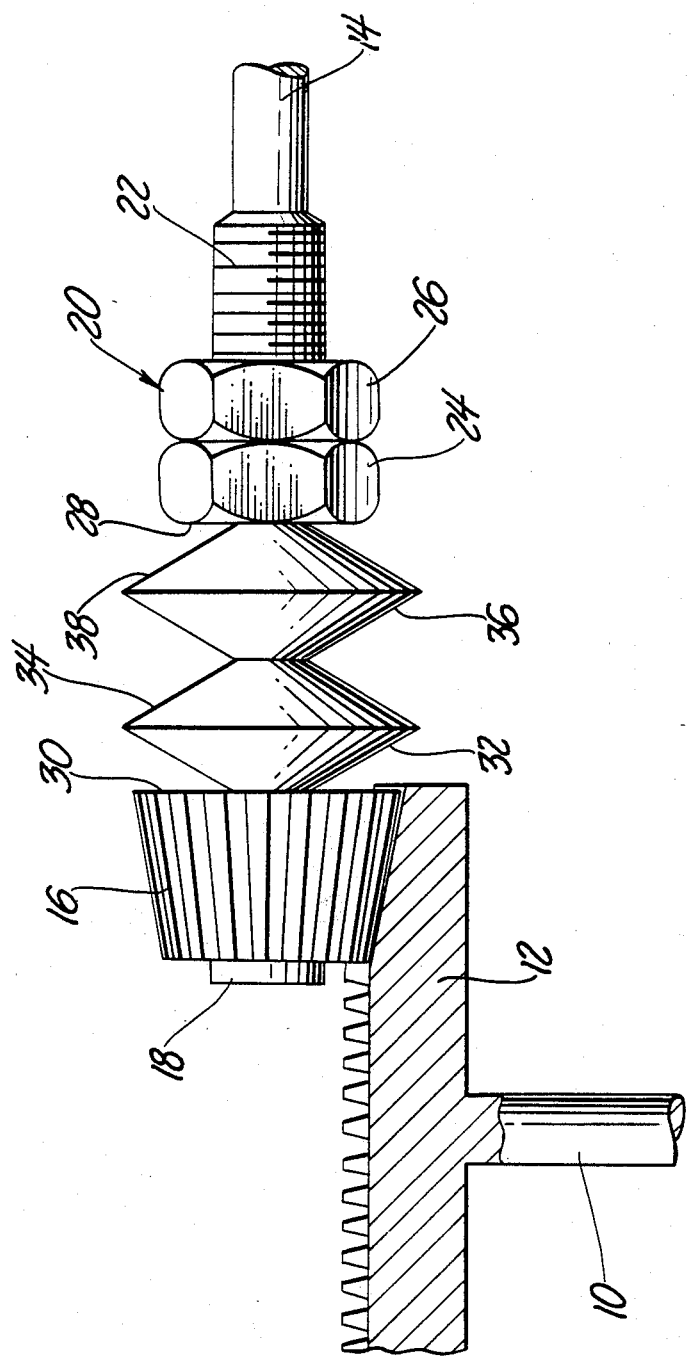

BEVEL GEAR BACKLASH AND CLUTCH DEVICE

GOVERNMENT INTEREST

The invention described herein may be manufactured, used, and licensed by or for the Government for governmental purposes without payment to me of any royalty thereon.

BACKGROUND OF THE INVENTION

1. Field of the invention

In one aspect this invention relates to gear drives. In a further aspect, this invention relates to clutch members. In yet a further aspect, this invention relates to antibacklash devices useful in gear trains.

2. Prior art

Adjustment of gear trains is always a problem since misaligned gears are subject to excessive, accelerated wear and also have severe backlash which causes further destruction of drive train components in the drive train. Misaligned gears also are the source of excessive noise and vibration which are annoying and destructive to the remainder of the system in which the gear train is mounted. Backlash can have another serious problem. Where the gear train is used to rotate a system such as a gun turret or maching table which must be indexed, any substantial backlash will result in indexing errors. Gears can be assembled in a misaligned configuration or the normal wear and tear from usage can result in gear problems. Thus problems can occur ab initio or during the normal life cycle of the mechanism. To prevent unusually rapid deterioration of the gear train during use, a periodic adjustment is recommended. This readjustment would realign the gears to compensate for the normal wear and tear. This is time consuming and merely restarts the wear cycle. It does not markedly improve or delay the maintenance cycle of the gear train.

The present systems of minimizing gear backlash and misalignment require the use of complex double gear trains. Such solutions are expensive to produce and also absorb a substantial amount of energy resulting in a lowered efficiency.

It would be desirable to provide an adjustment mechanism which would allow two bevel gears to be brought into alignment so the gears mesh properly during the initial assembly and which would also allow consant adjustment of the gear train to minimize wear on the gears and extend or better eliminate readjustment of the gears during the life cycle of the gear train. Such a system could allow a system to be assembled from lower tolerance, lower cost parts and would maintain good gear alignment during the life of the gear train.

The gear alignment and drive structure of the present invention provides a simple structure which will align two bevel gears allowing them to mesh fully along the entire tooth face. The invention comprises a first drive shaft attached to a source of power to be transferred to a gear train. The drive shaft has a first bevel gear rigidly mounted to the end of the shaft opposite the power source. A second driven shaft having a second beveled gear adapted to mesh with the first gear is mounted so the gears can be brought into engagement. The second beveled gear is journaled on the second shaft, and also can move axially on the second shaft. The second shaft has an adjustable stop having limited axial movement. A clutch mechanism is mounted between the driven gear and the adjustable stop to bias the gears into driving engagement. The drive gear provides the force to turn the second gear which in turn drives the second shaft through the clutch.

BRIEF DESCRIPTION OF THE DRAWING

In the accompanying drawing, the FIGURE is side view of a gear train formed in accordance with this invention.

DETAILED DESCRIPTION OF THE PREFERRED EMBODIMENTS

Referring to the accompanying drawing, a gear train structure according to this invention is shown with a first shaft 10 which is connected to a source of power (not shown). The shaft 10 has a first beveled, driven gear 12 rigidly mounted so rotation of the shaft causes a corresponding rotation of the first gear.

A second shaft 14 is mounted so that it can be driven by the power furnished to the first shaft 10. As shown, the second shaft 14 has a second beveled gear 16 mounted on one end of the shaft. The second gear 16 is journaled on the shaft 14 so it can freely rotate about the second shaft 14 and also move axially unless and until constrained from axial movement. The second gear 16 is held on the shaft by a head 18 formed on the end of shaft 14 which retains the second gear 16 near one end of the second shaft 14.

The second shaft 14 has an adjustable stop 20. As depicted, the adjustable stop 20 includes a threaded portion 22 on the shaft 14. A pair of nuts 24, 26 are mounted on the threaded portion. The nuts 24, 26 can be rotated to move axially along the longitudinal axis of the second shaft 14 to the desired location to adjust the system. When tightly turned into one another the nuts will jam preventing further rotation and thereby further axial movement. the surface 28 closest to the second bevel gear provides a radially extending surface which will cooperate with a base 30 of the second bevel gear 16 to define a fixed gap. A series of Belleville springs 32, 34, 36, 38 are mounted axially around the shaft 14 and disposed within the fixed gap defined by the surfaces 28, 30. As shown the Belleville springs are placed so that the largest base portions of the springs are in contact and the smaller upper surfaces of the Belleville springs are in contact. Four Belleville springs are shown but the adjustment mechanism will work with a lesser or greater numbers of the springs.

The Belleville springs will urge the second beveled gear 16 into engagement with the first beveled gear 12. The Belleville washers allow nonlinear forces to be applied to and received from the second beveled gear 16. This allows the second gear 16 to align itself with the first beveled gear to allow full meshing of the gear teeth.

When a rotating force is applied to the second gear 16, the frictional forces between the various components will allow the rotation to be transmitted to the second shaft 14. If the forces are greater than can be transmitted via the friction coupling of the Belleville springs, then the Belleville springs will slip acting as a clutch to prevent system damage.

The nuts 24, 26 forming the adjustable stop and be moved to control the amount of friction in the system and also the amount of bias applied to the driven gear 16. This will adjust the driven gear 16 to remove backlash in the system.

I wish it to be understood that I do not desire to be limited to the exact details of construction shown and described for obvious modifications will occur to a person skilled in the art, without departing from the spirit and scope of the appended claims.

What is claimed is:

1. An antibacklash beveled gear set comprising: a first drive shaft having a first beveled gear mounted thereon, the first shaft being connected to a source of power; a second shaft having a second beveled gear adapted to mesh with and be driven by the first gear, the second gear being journaled on the second shaft, so it rotates and has limited lateral movement, a plurality of Belleville springs arranged so that juxtaposed springs form a base to base, top to top contact, the Belleville springs being coaxially aligned about the second shaft with the end of the spring stack in contact with the driven bevel gear; and an adjustable stop mounted on the second shaft at the end of the Belleville spring stack opposite the second bevel gear, the stop being adjustable longitudinally but adapted to rotate in response to rotational forces transmitted through the Belleville springs causing rotation of the second shaft.

* * * * *